United States Patent
Hershkowitz et al.

(10) Patent No.: US 7,491,250 B2
(45) Date of Patent: Feb. 17, 2009

(54) PRESSURE SWING REFORMING

(75) Inventors: Frank Hershkowitz, Liberty Corner, NJ (US); Harry W. Deckman, Clinton, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 813 days.

(21) Appl. No.: 10/458,399

(22) Filed: Jun. 10, 2003

(65) Prior Publication Data
US 2003/0235529 A1    Dec. 25, 2003

Related U.S. Application Data

(60) Provisional application No. 60/391,360, filed on Jun. 25, 2002.

(51) Int. Cl.
- C01B 3/32 (2006.01)
- C01B 3/36 (2006.01)
- C10J 3/46 (2006.01)
- C10J 3/54 (2006.01)
- F28D 21/00 (2006.01)

(52) U.S. Cl. ............ 48/198.7; 48/197 R; 422/206
(58) Field of Classification Search ............ 48/61, 48/197, 214, 198.7, 197 R; 423/650, 652, 423/653, 654; 422/206
See application file for complete search history.

(56) References Cited

U.S. PATENT DOCUMENTS

| | | | |
|---|---|---|---|
| 1,726,877 A | 9/1929 | Battig | |
| 2,313,157 A | 3/1943 | Linder | 252/373 |
| 2,556,835 A * | 6/1951 | Barr | 48/198.1 |
| 2,845,335 A * | 7/1958 | Hasche | 422/206 |
| 3,429,678 A | 2/1969 | Milbourne et al. | 48/196 |
| 3,856,874 A * | 12/1974 | Hayward | 585/302 |
| 3,926,583 A * | 12/1975 | Rostrup-Nielsen | 48/127.7 |
| 4,200,682 A | 4/1980 | Sederquist | 429/17 |
| 4,240,805 A * | 12/1980 | Sederquist | 48/214 R |

(Continued)

FOREIGN PATENT DOCUMENTS

EP    0219163    4/1987

(Continued)

OTHER PUBLICATIONS

"Conversion Catalytique Et Cyclique Des Hydrocarbures Liquides Et Gazeux" Societe ONIA-GEGI 4, place des Etats-Unis 92 Montrouge, pp. 1-32.

*Primary Examiner*—Alexa D. Neckel
*Assistant Examiner*—Matthew J Merkling
(74) *Attorney, Agent, or Firm*—Lawrence E. Carter; Paul E. Purwin

(57) ABSTRACT

Synthesis gas is produced though a cyclic method where the first step of the cycle includes reforming a hydrocarbon feed over a catalyst to synthesis gas in a first zone of a bed and the second step reheats this first zone. A hydrocarbon feed is introduced to a bed along with $CO_2$ and optionally steam where it is reformed into synthesis gas. The synthesis gas is collected at a second zone of the bed and an oxygen-containing gas is then introduced to this second zone of the bed and combusted with a fuel, thereby reheating the first zone to sufficient reforming temperatures. Additionally, a non-combusting gas can also be introduced to the second zone to move heat from the second zone to the first zone.

15 Claims, 2 Drawing Sheets

U.S. PATENT DOCUMENTS

| | | | |
|---|---|---|---|
| 4,293,315 A | 10/1981 | Sederquist | 48/94 |
| 4,642,272 A | 2/1987 | Sederquist | 429/17 |
| 4,751,055 A | 6/1988 | Jubin | 422/190 |
| 4,816,353 A | 3/1989 | Wertheim et al. | 429/19 |
| 5,492,649 A | 2/1996 | Christensen | 252/372 |
| 5,980,596 A | 11/1999 | Hershkowitz et al. | 48/127.9 |
| 5,985,178 A | 11/1999 | Long et al. | 252/373 |
| 6,103,143 A | 8/2000 | Sircar et al. | 252/373 |
| 6,113,874 A | 9/2000 | Kobayashi | 423/650 |
| 6,210,157 B1 | 4/2001 | Kobayashi | 432/181 |
| 6,302,188 B1 | 10/2001 | Ruhl et al. | 165/10 |
| 6,767,530 B2 | 7/2004 | Kobayashi et al. | 423/650 |
| 2003/0113257 A1 | 6/2003 | Kobayashi et al. | 423/652 |

FOREIGN PATENT DOCUMENTS

| | | |
|---|---|---|
| GB | 1365744 | 9/1974 |
| GB | 1421767 | 1/1976 |
| GB | 2265380 | 9/1993 |
| GB | 2265381 | 9/1993 |
| GB | 2265382 | 9/1993 |
| SE | 148275 | 7/1919 |
| WO | WO2004/000725 A1 | 12/2003 |

* cited by examiner

Reforming

Regeneration

PRESSURE SWING REFORMING

This application claims the benefit of U.S. Provisional Application 60/391,360 filed Jun. 25, 2002.

FIELD OF THE INVENTION

The present invention relates generally to a method for producing synthesis gas. More particularly, the invention relates to a cyclic, steam reforming process wherein a hydrocarbon containing feed is converted to a mixture of carbon monoxide and hydrogen.

BACKGROUND OF THE INVENTION

Conventional synthesis gas generating processes include steam reforming, gas phase partial oxidation and autothermal reforming. Each of these processes has advantages and disadvantages when compared to each other.

In a steam reforming process, steam is reacted with a hydrocarbon containing feed to produce a hydrogen-rich synthesis gas. The general stoichiometry, as illustrated for methane, is:

$$CH_4 + H_2O \longrightarrow CO + 3H_2 \quad (1)$$

Typically, an excess of steam is used to drive the equilibrium to the right. As applied to hydrogen manufacture, excess steam also serves to increase water gas shift:

$$CO + H_2O \longrightarrow CO_2 + H_2 \quad (2)$$

Because of the high endothermicity of the reaction, steam reforming is typically carried out in large furnaces, in which the catalyst is packed into tubes. The tubes must withstand the high pressure of the produced synthesis gas, while transmitting heat at temperatures approaching 1000° C. As described in Stanford Research Institute International Report No 148A (1995), steam reforming process efficiency, defined as the heat of combustion of product synthesis gas divided by the heat of combustion of reforming feed and furnace fuel, is approximately 79%, while the space velocity, defined as Standard Cubic Feet per Hour of $C_1$-equivalent feed/ft³ of catalyst bed is 690 hr$^{-1}$. Unfortunately, steam reforming furnaces occupy a very large volume of space, orders of magnitude greater than the tube volume, such that low productivity limits the economic attractiveness of the process.

The gas phase partial oxidation process involves the partial oxidation of the hydrocarbon containing feed in the gas phase. The feed components are introduced at a burner where they combust with sub-stoichiometric oxygen to produce a synthesis gas mixture. The ideal gas phase partial oxidation reaction, as illustrated for methane, is:

$$CH_4 + \tfrac{1}{2}O_2 \longrightarrow CO + 2H_2 \quad (3)$$

However, gas-phase reaction kinetics tend to over-oxidize some of the feed, resulting in excessive heat generation and substantial yield of $H_2O$, $CO_2$, and unreacted hydrocarbons that may leave the reactor as soot.

For these reasons, when gas phase partial oxidation chemistry is applied to clean feeds, it is preferred to add steam to the feed and add a bed of steam reforming catalyst to the bottom of the gas phase partial oxidation reactor vessel. This combination of gas phase partial oxidation and steam reforming is called autothermal reforming. The heat needed for steam reforming is provided in-situ from the excess heat generated by the gas phase partial oxidation reactions. Autothermal reforming can be substantially more compact than steam reforming because furnaces are not used to provide heat of reaction. Embodiments of autothermal reforming presently under development for gasoline-powered fuel cell vehicles make use of a catalytic partial oxidation step, which can impart even greater compactness to the autothermal reforming process. The thermal efficiency of autothermal reforming reactors are generally in the range of 90%. While auto-thermal reforming based on catalytic partial oxidation may have high productivity (gas hourly space velocity on order of $10^4$ as $C_1$-equivalent), conventional partial oxidation-based autothermal reforming has a space velocity very similar to that of steam reforming (about $10^3$ hr$^{-1}$). However, autothermal reforming requires a source of oxygen. In the fuel cell vehicle case, this oxygen in typically provided as low-pressure air, which results in a nitrogen-diluted, low-pressure synthesis gas, while in refinery or chemicals embodiments, this oxygen is typically provided as purified $O_2$, and the cost of air separation can be greater than the cost of the autothermal reforming process.

(U.S. Pat. Nos. 4,200,682, 4,240,805, 4,293,315, 4,642,272 and 4,816,353) to Sederquist teach a steam reforming process in which the heat of reforming is provided within the bed by cycling between combustion and reforming stages of a cycle. As described by Sederquist, the high quality of heat recovery within the reforming bed results in a theoretical efficiency of about 97%. However, the examples and commercial projections within these patents describe a process that operates at very low productivity, with space velocities of around 95 hr$^{-1}$ (as $C_1$-equiv). Moreover, this process requires a compressor to compress the product synthesis gas to useful pressures.

Thus, there exists the need for a synthesis gas production process that operates at high efficiency and productivity, without the burdens of large furnaces, air ($O_2$) separation or synthesis gas compressors.

SUMMARY OF THE INVENTION

The present invention provides a highly efficient and highly productive process for producing synthesis gas in a cyclic, packed-bed operation. The reforming step involves preheating a first zone to a temperature in the range of about 700° C. to 2000° C. and then introducing a 20° C. to 600° C. hydrocarbon-containing feed, along with steam and optionally $CO_2$ to the inlet of the first zone. Upon introduction of the reactants, the hydrocarbon is reformed into synthesis gas over a catalyst in this first zone. The synthesis gas is then passed from the first zone to a second zone, where the gas is cooled to a temperature close to the inlet temperature of the hydrocarbon feed. The synthesis gas is recovered as it exits the inlet of the second zone.

The regeneration step begins when a gas is introduced to the inlet of the second zone. This gas is heated by the stored heat of the second zone to the high temperature of the zone and carries the heat back into the first zone. Finally, an oxygen-containing gas and fuel are combusted near the interface of the two zones, producing a hot flue gas that travels across the first zone, thereby re-heating that zone to a temperature high enough to reform the feed. Once heat regeneration is completed, the cycle is completed and reforming begins again.

An advantage of the present invention is the ability to operate the reforming step at a higher pressure than the regeneration step, thus creating a pressure swing, and producing high pressure synthesis gas.

In order to make this process even more efficient, the inlet gas can be heat exchanged with the exiting products and fluegas.

DETAILED DESCRIPTION OF THE INVENTION

The general methods of synthesis gas formation, such as catalytic partial oxidation, autothermal reforming and steam reforming are well known in the art. In the present invention, a new method for making synthesis gas using steam reforming chemistry in a cyclic, packed-bed operation is presented. Thus, one step of the cycle includes combustion in the bed to raise the temperature to an elevated level, and a second step reforms hydrocarbon with steam and optionally $CO_2$ using the heat stored within the bed.

Figure 1A:
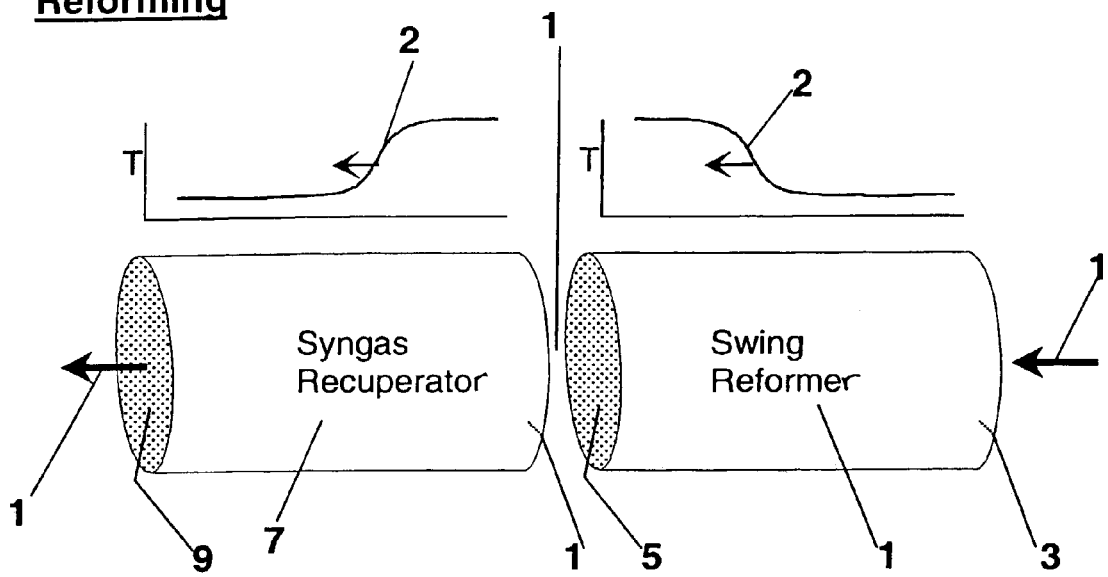
FIGS. 1(a) and 1(b) are diagrammatic illustrations showing the basic two-cycle scheme according to one embodiment of the invention.
Figure 1B:
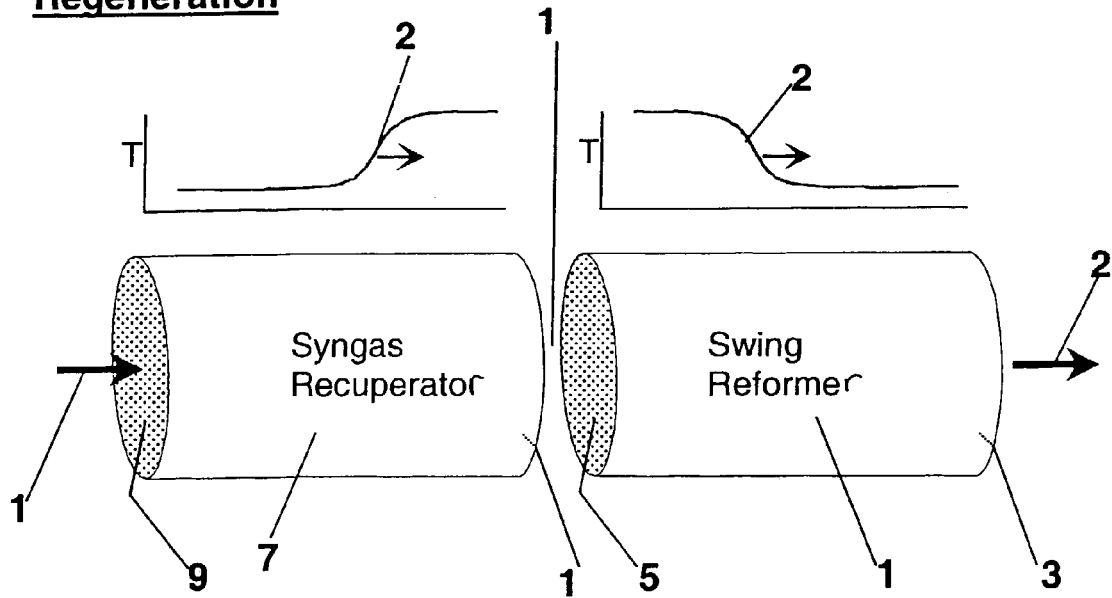

FIG. 1 details one embodiment of the process for pressure swing reforming. The scheme is described in terms of the use of two zones, a first zone, or reforming zone (1), called a swing bed reformer, and a second zone, or recuperating zone, called a synthesis gas heat recuperator (7). However, this process may be carried out sufficiently in a single bed containing two distinct zones, a reforming zone and a recuperating zone. The beds of both zones will include packing material, while the reforming bed (1) will include catalyst for steam reforming and optionally combustion.

FIG. 1(a) illustrates the reforming step of the present invention. At the beginning of the cycle, the reforming zone (1) is at an elevated temperature and the recuperating zone (7) is at a lower temperature than the reforming zone. The hydrocarbon-containing feed (15) is introduced at a temperature in the range between about 20° C. to 600° C. and preferably between about 250° C. to 450° C., to a first end (3) of the reforming zone (1) along with steam and optionally $CO_2$. This stream picks up heat from the bed and is converted over the catalyst and heat to synthesis gas. As this step proceeds, a temperature profile (23) is created based on the heat transfer properties of the system. At properly chosen conditions, this profile is relatively sharp and will move across the reforming zone (1) as the step proceeds.

Synthesis gas exits the reforming bed (1) through a second end (5) at an elevated temperature and passes through the recuperating zone (7), entering through a first end (11) and exiting at a second end (9). The recuperating zone (7) is initially at a lower temperature than the reforming zone (1). As the synthesis gas passes through the recuperating zone (7), the synthesis gas is cooled to the temperature of the zone substantially at the second end (9), which is approximately the same temperature of the hydrocarbon-containing feed, in the range of from about 20° C. to 600° C. As the synthesis gas is cooled in the recuperating zone (7), a temperature profile (24) is created and moves across the recuperating zone (7) during this step. In one embodiment of the present invention, the first step of the cycle ends when temperature breakthrough begins to occur at a second end (9) of the recuperating zone (7).

At the point between steps, the temperature gradient has moved substantially across the reforming zone (1) and into the recuperating zone (7). The zones are sized so that the gradients move across both in comparable time during the above reforming step. The recuperating zone (7) is now at the high temperature and the reforming zone (1) is at low temperature, except for the temperature profile that exists near the exits of the respective zones.

After the synthesis gas (17) is collected at the second end (9) of the recuperating zone (7), the regeneration step begins. In one embodiment, the regeneration step proceeds in two substeps. First, a non-combusting gas (19), is introduced into the second end (9) of the recuperating zone (7) in the opposite flow direction of the reforming flow. The inlet temperature of this gas will determine the temperature of the recuperating zone substantially at the second end (9) at the end of this step. Thus, it will be equal, or substantially equal to the initial outlet temperature of the synthesis gas of reforming. Non-combusting gas includes steam, air, fluegas, re-circulated inert gas, hydrogen- or hydrocarbon-containing streams, or any gas that does not contain both fuel and oxidant. This gas (19) is heated by the high ambient temperature of the bed (7), enters the second end of the reforming zone (5) and carries this heat into the reforming zone (1). Again, temperature profiles (26 and 27) are created based on flow and bed conditions, and these profiles move across the zones in the opposite direction from the reforming step to essentially move enthalpy from the recuperating zone (7) to the reforming zone (1). However, the heat stored in the recuperating zone (7) is derived only from the sensible heat of cooling the synthesis gas, while the heat to be replaced in the reforming zone (1) includes both the sensible heat of heating the hydrocarbon/steam and optional carbon dioxide mixture (15) and the endothermic heat of reforming. Thus, this first substep will remove heat from the recuperating zone (7) before the reforming zone (1) is completely filled with heat, and will leave the temperature gradient (27) only partially across the reforming zone (1).

In another embodiment, this first substep is eliminated and regeneration begins with the second substep.

In the second substep of regeneration, an oxygen-containing gas (19) and fuel are introduced into the second end of the recuperating zone (9). This mixture flows across the recuperating zone (7) and combusts substantially at the interface of the two zones (13). It is important that the combustion occur at, or substantially at, the interface (13) because the recuperating zone (7) must be at a low temperature at the start of the reforming step in order for it to capture the heat from the synthesis gas that exits through the second end of the reforming zone (5). Thus, combustion that occurs before the end of the recuperating zone (11) will leave that section of the zone at elevated temperatures and unable to perform its function during reforming. Likewise, if combustion begins somewhere within the reforming bed (1), the incoming gas will cool some of the reforming zone, leaving that section unable to fully perform its function.

In one embodiment, the location of combustion is fixed by introduction of one of the combustion components, preferably the fuel, at a location at, or substantially at, the interface of the two zones (13), while the other component, preferably the oxygen-containing gas (19) is introduced at the inlet of the recuperating zone (7). In another embodiment, the fuel and oxygen-containing gas (19) streams are mixed at the open end of the recuperating zone (7) and travel through the zone and combust at the interface of the zones (13). In this embodiment, the location of combustion is controlled by a combination of temperature, time, fluid dynamics and catalysis. Fuel and oxygen usually require a temperature-dependent autoignition time to combust. The flow of the non-combusting mixture in the first substep of regeneration will set the temperature profile in the recuperating zone (7) such that the zone is not hot enough to ignite until the mixture reaches the interface of the zones.

The presence of catalyst on the reforming zone can also be used to initiate combustion at that location, and a space between the reforming and recuperating zones can be added and designed to further stabilize the combustion process. In yet another embodiment, the location of combustion is fixed by use of a special mechanical design of the recuperating zone. In this design, the fuel and oxygen-containing gas are travelling in separate channels, which prevent combustion until the feeds combine at the interface of the zones (13). At that location, flame holders or the catalyst in the reforming zone will ensure that the combustion occurs. Both channels have thermal contact with the majority of the bed, although some loss of heat transfer may occur. Further, valves that control the flow of air are closed during reforming and the synthesis gas will use the same channels as the compatible hydrocarbon fuel.

The combustion of the fuel and oxygen-containing gas creates a hot fluegas that travels across and heats the reforming zone (1). The fluegas then exits through the first end of the reforming zone (3). The composition of the oxygen-containing gas/fuel mixture is adjusted accordingly to provide the desired temperature of the reforming zone. When the hot fluegas reaches the temperature gradient within the reformer, the gradient moves further across the bed. The regeneration step ends when temperature breakthrough begins to occur at the first end of the reforming zone (3). The outlet temperature of the fluegas will be equal, or substantially equal to the inlet temperature of the hydrocarbon, steam and optional $CO_2$ feed of reforming.

In an alternative embodiment, the first substep of regeneration, described above, is carried out after the second substep described above. In this embodiment, it is allowable for the combustion to occur at locations within the recuperating zone, because the flow of non-combusting gas is subsequently used to transfer the combustion heat from the recuperating zone to the reforming zone. In one embodiment of this alternative, combustion occurs at or substantially at the second end (9) of the recuperation zone. It is also possible to heat the zone using an electric heat source used in combination with the combustion step of regeneration. The use of this electric heat source will create a sharper temperature profile than if regeneration proceeded without the electric heat source.

In the practice of this invention, both hydrocarbon feed and fuel traverse the beds as gaseous materials. Thus, the hydrocarbon and fuel streams should be gaseous materials or will rapidly become substantially gaseous materials upon first introduction into the respective beds. The hydrocarbon may be any material that undergoes endothermic steam reforming reaction, including methane, methanol, petroleum gases, petroleum distillates and gasoline. The hydrocarbon may optionally include in its composition oxygen, nitrogen and sulfur heteroatoms. Further, the hydrocarbon may be diluted with inert gases or non-reformable fuels, such as hydrogen and carbon monoxide. The fuel may include any of these hydrocarbon materials, in addition to non-reformable fuels such as hydrogen and carbon monoxide.

It is highly desirable to carry out the invention with a pressure swing. By pressure swing, is meant operating the two steps of the cycle at different pressures. This is advantageous because it is costly to compress air to high pressure, while it is desirable to have synthesis gas at high pressure. Thus, in a preferred embodiment, the reforming step is carried out at higher pressures than the regeneration step. The pressure swing is enabled because of the large volumetric heat capacity difference between the solid and the gas.

It is particularly desirable to combust the oxygen-containing gas and fuel at low pressure. Thus, the first regeneration substep, if utilized, can be carried out at a third pressure that could be intermediate between the reforming and combusting pressures.

Preferred regeneration pressures will be in the range of 1 to 10 atm, and more preferably 1 to 5 atm. Preferred reforming pressures are dependent upon the ultimate application for the synthesis gas. For example, where the synthesis gas is used to provide hydrogen to a fuel cell, the reforming pressure may be 1 to 10 atm, whereas synthesis gas used for industrial applications such as hydrocarbon or methanol synthesis, reforming pressures may be 5 to 50 atm. Application to production of highly compressed hydrogen may lead to preferred reforming pressures of 100 atm. or higher.

The space velocity of a system is frequently expressed on an hourly basis as the standard volumetric gas flow rate of feed divided by the volume of catalyst bed, called gaseous hourly space velocity, or GHSV. Space velocity can also be defined in terms of the hydrocarbon component of feed. As so defined, the GHSV for a methane feed would be the standard hourly volumetric gas flow rate of methane divided by the bed volume. As used herein, the term space velocity, abbreviated as $C_1$GHSV, refers to the space velocity of any hydrocarbon feed placed on a $C_1$ basis. As such, the hydrocarbon feed rate is calculated as a molar rate of carbon feed, and standard volume rate calculated as if carbon is a gaseous species. For example, a gasoline feed having an average carbon number of 7.0 that is flowing at a gaseous flow rate of 1,000 NL/hr into a 1.0 L bed would be said to have a space velocity of 7,000. This definition is based on feed flow during the reforming step. For steam reforming processes, $C_1$GHSV is particularly relevant because it scales well with product rates and with heat of reforming.

The productivity of a system is directly proportional to the space velocity. Therefore, it is highly desirable to have a system with a high space velocity. Average, or net productivity is calculated using this space velocity and the fraction of the total cycle time spent in the reforming step.

In the practice of this invention, the average bed temperature, including both the reforming zone (1) and recuperating zone (7) will drop in temperature over the course of the reforming step. This temperature drop, multiplied by bed heat capacity, is the amount of heat released by the bed, and is roughly equal to the amount of heat consumed by the steam reforming reaction. Since the heat of reforming of the hydrocarbon is fixed by thermodynamics, this temperature drop essentially fixes the amount of hydrocarbon feed that is converted. If the hydrocarbon is fed at a high rate (high GHSV), the heat is used up rapidly and cycle time must be short. If the feed hydrocarbon is fed at a slow rate (low GHSV), the heat is used up slowly and cycle time is longer.

Mathematically, this is equivalent to saying that:

$$(C_1 GHSV)(\tau_{REFORM}) \propto \frac{(\Delta T_{REGEN-REFORM})(Cp_{BED})}{\Delta H_{REFORM}}$$

In a preferred embodiment, space velocity ($C_1$GHSV) is preferably greater than 500, and even more preferably greater than 1000. These criteria are sufficient for the process to be efficient and cost effective.

The quantity ($C_1$GHSV*$\tau_{REFORM}$) is proportional to the standard volume of gas reformed per cycle per volume of catalyst bed. As such, the parameter is analogous to a turnover ratio, and is herein defined as the "Standard Volume Turnover Ratio" (SVTR). In a preferred embodiment of the present invention, the cycle is operated at higher pressure during reforming. For those embodiments, it is particularly advantageous for SVTR to be as large as possible. In the present invention, SVTR is preferably greater than 5, and more preferably greater than 10. For embodiments involving substantial pressure swing, it is preferred to have SVTR be greater than 20.

It is desirable to have a high reforming temperature in the reforming zone (1) because as temperature increases, equilibrium shifts toward the production of synthesis gas for most hydrocarbons, thus reducing the amount of steam and optional $CO_2$ that is required to drive the reaction to completion. In a preferred embodiment, reforming temperatures are in the range of about 700° C. to 2000° C., more preferably in the range of about 900° C. to 1600° C., and even more preferably between about 1000° C. to 1400° C.

In one embodiment, a control mechanism is attached to the system that measures temperatures within the zones. By using this information, the mechanism will control the change from one step to another. For example, when temperatures near the second end of the reforming zone (5) reach a pre-determined level, the control mechanism allows for the change to regeneration step. Alternatively, when temperatures near the first end of the reforming zone (3) reach a set point based on heat leak, the mechanisms senses this and ends regeneration and begins reforming. In yet another embodiment, the control mechanism could measure the composition of product at or substantially at the second end of the regenerating zone (9). In this situation, when synthesis gas composition indicates a deterioration of steam reforming reaction rate (e.g. increased hydrocarbon content or decreased hydrogen gas), the control mechanism would end the reforming step and begin the regeneration step.

Because of the desire to reform at high temperatures to enable a high space velocity system, it is therefore preferable to have high hydrocarbon steam and optional $CO_2$ feed inlet temperatures. In order to preserve the efficiency of the system, the hydrocarbon steam and optional $CO_2$ feed can be heat exchanged with the reforming products. Similarly, the fluegas product can be heat-exchanged with the oxygen-containing gas.

Figure 2:
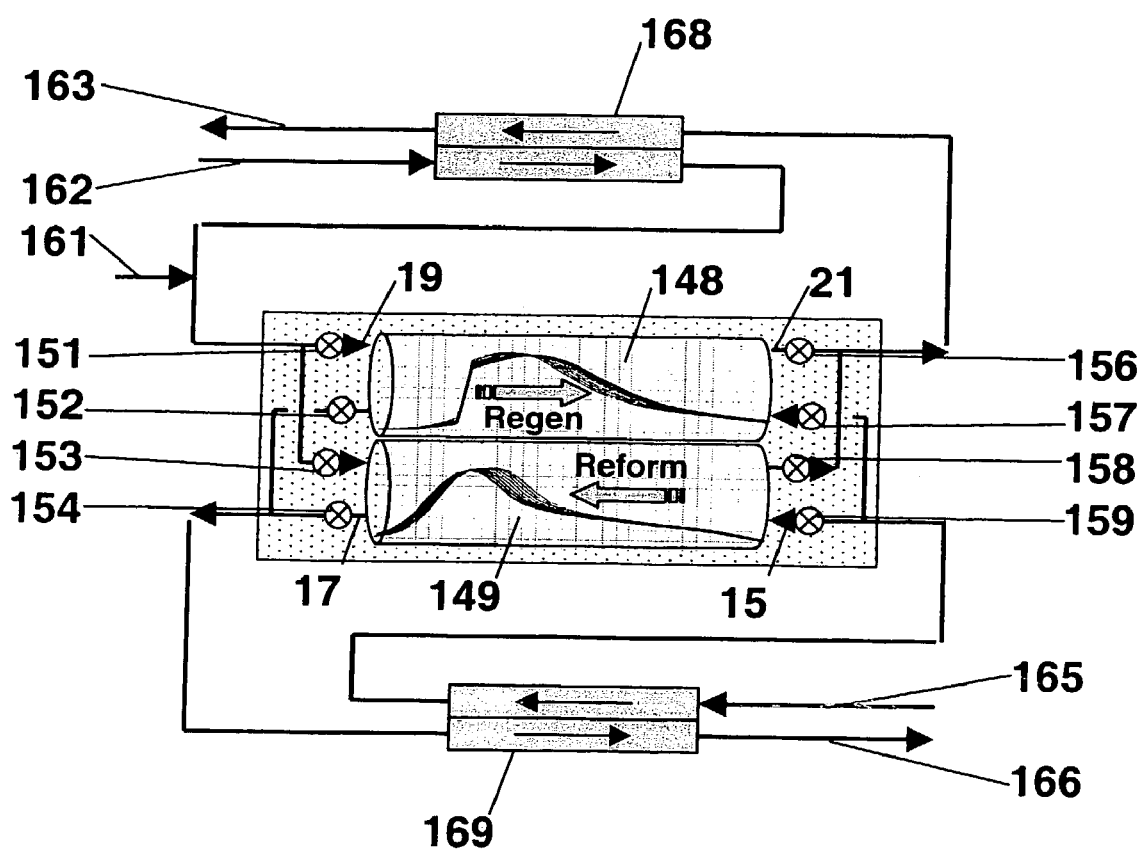
FIG. 2 is a diagrammatic illustration showing a two-cycle scheme with heat exchange of the gases according to one embodiment of the invention.

FIG. 2 illustrates one embodiment of the process employing heat exchange. In this embodiment, two pressure swing reforming bed systems are used simultaneously such that one system is reforming while the other is regenerating. The use of multiple beds can provide a continuous flow of reformed product notwithstanding the cyclical operation of each bed. In FIG. 2, a first bed (148) is engaged in the step of regeneration, while a second bed (149) is engaged in the step of reforming. Each bed (148 and 149) includes both reforming and recuperating zones. In this embodiment, several sets of valves are used to control the various streams flowing to and from the beds. A first set of valves (157 and 159) controls the flow of hydrocarbon, steam and optional $CO_2$ feed to the beds, while a second set of valves (152 and 154) control the flow of the product of the reforming step exiting the recuperating zones. The third set of valves (151 and 153) regulate the flow of oxygen-containing gas/fuel and optional non-combusting gas to the beds and the fourth set of valves (156 and 158) control the flow of fluegas exiting the reforming zone.

In operation, when valves 151, 154, 156, and 159 are open, valves 152, 153, 157, and 158 are closed. With these valve states, oxygen containing gas (162) and fuel (161) enter the bed (148) through valve 151 while fluegas exits the bed (148) through valve 156. Concurrently, the hydrocarbon, steam and optional $CO_2$ feed enters the second bed (149) through valve 159 while the product of reforming exits this bed (149) through valve 154. At the conclusion of this step, valves 152, 153, 157 and 158 now open and valves 151, 154, 156 and 159 now close, and the cycle reverses, with the first bed (148) reforming the feed and the second bed (149) regenerating the heat.

In this embodiment, the incoming oxygen-containing stream (162) is heat exchanged against the exiting fluegas stream (163) via a counter-current heat exchanger (168) and incoming reforming feed stream (165) is heat exchanged against the exiting reformed product stream (166) via a counter-current heat exchanger (169). The heat exchange is made possible when the products are in the range of about 10° to 100° C. hotter than the feeds. Heat exchange occurs outside of the zones and can be controlled based on the amount of surface area of the heat exchanger.

There are important features of the bed packing material that must be set to accommodate the high space velocity. These features are related to the heat transfer capability of the packing.

It is well known in the art that bed packing can be characterized for heat transfer coefficient (h) and characterized for heat transfer surface area (often referred to as wetted area, a). Correlations for these parameters, based on gas and solid properties, are well known. The product of these two parameters is the bed's heat transfer coefficient on a bed volume basis:

Volumetric heat transfer coefficient:

$$h_V = \frac{BTU}{(ft^3 Bed)(°F)(s)} \text{ or } = \frac{kcal}{(L\ Bed)(°C)(s)}$$

Note that heat transfer coefficients are sensitive to a variety of gas properties, including flow rate and composition. Coefficients are typically higher during reforming because the hydrogen in the gas has very high thermal conductivity. Coefficients are typically increased by decreasing the characteristic size of the packing (hence ⅛" beads will have higher $h_v$ than ½" beads).

The heat of reforming of hydrocarbons is well known, and can be expressed on a basis of units of heat per standard volume of hydrocarbon gas. It has been discovered that the heat transfer requirement for this system can be expressed as the product of volumetric heat of reforming with the GHSV of the feed.

Volumetric heat transfer requirement:

$$H = \frac{GHSV \cdot \Delta H_{REF}}{3600\ s/hr} = \frac{BTU}{(ft^3 Bed)(s)} \text{ or } = \frac{kcal}{(L\ Bed)(s)}$$

In this equation, GHSV and $\Delta H_{REF}$ must have identical units of feed amount. Thus, if the units of GHSV are as NL/hr of $C_1$ per L bed, then the units of $\Delta H_{REF}$ should be as heat or reaction per NL of $C_1$. This equation works equally well with GHSV defined on other basis. For example, if GHSV is calculated as NL/hr total hydrocarbon per L bed, then $\Delta H_{REF}$ should be expressed as heat or reaction per NL of total hydrocarbon. Calculated as such, the value of H is not dependent on the choice of basis for the GHSV calculation.

Furthermore, it was discovered that one can derive a characteristic heat transfer delta-temperature as the ratio of volumetric heat transfer requirement to volumetric heat transfer coefficient.

Characteristic heat transfer $\Delta T_{HT} = H/h_v$.

This characteristic $\Delta T_{HT}$ describes the balance between heat transfer supply and demand. As used herein, the $\Delta T_{HT}$ is calculated using heat transfer coefficients based on typical regeneration conditions. This basis is used because regeneration conditions typically have lower heat transfer coefficients (due to composition), and thus represent the limiting condition for the system. The characteristic $\Delta T_{HT}$ is a basic design parameter for the present embodiment. Packing or space velocity can be chosen to satisfy characteristic $\Delta T_{HT}$ requirements of this invention.

Operation of the preferred embodiment with too high a characteristic $\Delta T_{HT}$ will result in shallow temperature gradients and an inability of the reforming and recuperation beds to efficiently capture heat. This results in loss of efficiency. The operation of the present invention is not negatively influenced by design for very small characteristic $\Delta T_{HT}$. However, very small $\Delta T_{HT}$ indicates more heat transfer capacity is present than is needed, and typically such a system could be better optimized by using a larger packing size and resulting lower pressure drop.

In the practice of this embodiment, the characteristic $\Delta T_{HT}$ should be between about 0.1° C. and 500° C. This represents the range of operable solutions. More preferably, the characteristic $\Delta T$ should be between about 0.5° C. and 40° C. This range offers designs that are more optimal in terms of pressure drop and thermal efficiency. While this range appears large, applications of this technology range in scale from battery replacements to refineries. These different applications may well have different determinants for what is optimal.

As an example, if a packing has a heat transfer coefficient of 10 BTU/ft³s° F., then given a methane heat of reforming of 248 BTU/scf the $C_1$GHSV achievable at a characteristic $\Delta T_{HT}$ of 40° C., would be ~1.5×10⁴ hr⁻¹. Given bed packing materials that are presently known in the art, including particulate packing, and foam and honeycomb monoliths, the present invention can be operated at high efficiency at a space velocity up to about 100,000 hr⁻¹.

The bed packing material must satisfy several important requirements. It must have the ability to cycle repeatedly between high and low temperatures, provide high heat transfer, have low resistance to flow (low pressure-drop), have operating temperature consistent with the highest temperatures encountered during regeneration, and have high resistance to thermal shock. Furthermore, it is preferred that the material have high heat capacity, as this will lead to more advantageous cycle times. Additionally, the bed packing material must also provide sufficient support for the reforming catalyst in the reforming bed. These requirements are met via control of the shape, size, and composition of the bed packing materials.

The shape and size of the bed packing material plays a fundamental role to the beds heat transfer capability and flow resistance. This is because packing shape and size strongly influence how the fluid flows through the packing, including, most importantly, the size and turbulence in the fluid boundary layers that are the primary resistance to heat, mass and momentum transfer between fluid and solid. Furthermore, the size of the materials is also important to thermal shock resistance of the bed, because larger structures are sometimes susceptible to thermal shock. The shape is important to bed heat capacity through its relationship on bed void volume. The design of advantageous packing shapes is well know in the art. Historically, packing has been designed to facilitate mass transfer, as in gas-liquid contacting columns, but those design principles are similarly applicable to heat transfer. More recently, U.S. Pat. No. 6,302,188, hereinafter incorporated by reference, describes advantageous packing shapes for the Regenerative Thermal Oxidizer (RTO) application, which has many of the same requirements as the present invention.

The composition of the bed packing material is important to operating temperature and thermal shock resistance. Thermal shock resistance is generally greatest for materials having low coefficients of thermal expansion, because it is the temperature-induced change in size that stresses a component when temperatures are changing due to cycling. Ceramic materials have been developed that are resistant to combustion temperatures and thermal shock, particularly for application in engine exhaust filters and regenerative thermal oxidizers. Cordierite materials (magnesium aluminum silicates) are preferred for their very low coefficients of thermal expansion. Preferred materials of construction include aluminum silicate clays, such as kaolin, aluminum silicate clay mixed with alumina, or aluminum silicate clay and alumina mixed with silica and optionally zeolites. Other candidate materials of construction include mullite, alumina, silica-alumina, zirconia, and generally any inorganic oxide materials or other materials stable to at least 1000° C. The bed packing materials of the regenerating zone can either be the same or different from the packing materials of the reforming zone.

The configuration of the beds within the reforming and recuperating zones may take the many forms that are known in the art. Acceptable configurations include horizontal beds, vertical beds, radial beds, and co-annular beds. Packing may be monolithic or particulate in design. Particulate packing may become fluidized during some steps of the present invention. In a preferred embodiment, bed packing is maintained in a fixed arrangement.

Suitable reforming catalysts include noble, transition, and Group VIII components, as well as Ag, Ce, Cu, La, Mo, Mg, Sn, Ti, Y, and Zn, or combinations thereof. As used herein, the term component relates to a metal or metal oxide thereof. Preferred catalyst systems include Ni, NiO, Rh, Pt, and combinations thereof. These materials may be deposited or coated on, or in, catalyst supports well known in the art.

The following examples will serve to illustrate, but not limit this invention.

EXAMPLE 1

Synthesis gas is produced in a 7.62 cm diameter pressure swing reformer (PSR) bed composed of two zones, an 8.47 cm long reforming zone and a 4.23 cm long recuperating zone. The bed packing material of the zones comprises of 60 ppi ceramic foam monolith, having a pore fraction of 80% and a heat transfer surface area of 115 cm²/cm³. The cycle time is 6 seconds, 3 seconds for regenerating and 3 seconds for reforming. The reforming bed is preheated to 1300° C. by introducing an oxygen-containing gas at 375° C. and 2 atm, and combusting with 1.86 g CH₄ fuel, which is fed at the interface of the beds. Products of combustion include O₂-depleted air, H₂O and CO₂. During the reforming step, steam and CH₄ are fed into the reforming bed at 375° C. and 3 atm. Reforming produces H₂, CO, CO₂, H₂O and CH₄. The results of this example are shown in Table 1.

TABLE 1

| g/cycle | Reforming feed | Reforming product | Combustion Feed | Combustion product |
|---|---|---|---|---|
| H2O | 14.34 | 6.34 | — | 4.25 |
| O2 | — | — | 25.17 | 17.73 |
| N2 | — | — | 93.05 | 92.92 |
| CO2 | — | 2.46 | — | 5.18 |
| CH4 | 6.37 | 0.11 | 1.86 | — |
| CO | — | 9.32 | — | — |
| H2 | — | 2.48 | — | — |

EXAMPLE 2

Synthesis gas is produced in a 20 cm diameter PSR bed composed of two zones, a 12 cm long reforming zone and a 6 cm long recuperating zone. The bed packing material is comprised of ⅛" spherical ceramic beads with a 0.35 void fraction and a heat transfer surface area of 12.3 cm²/cm³. The cycle time is 60 seconds, 30 seconds for regenerating and 30 seconds for reforming. The reforming bed is preheated to 1200° C. by flowing a mixture of air and flue gas at 450° C. and 1.5 atm, and combusting with 56 g CH₄ fuel, which is fed at the interface of the beds. Products of combustion include O₂-depleted air, H₂O and CO₂. During the reforming step, steam and CH₄ are fed into the reforming bed at 450° C. and 12 atm. Reforming produces H₂, CO, CO₂, and H₂O. The results of this example are shown in Table 2.

TABLE 2

| g/cycle | Reforming feed | Reforming product | Combustion Feed | Combustion product |
|---|---|---|---|---|
| H2O | 408 | 184 | 312 | 438 |
| O2 | — | — | 224 | 1 |
| N2 | — | — | 2690 | 2689 |
| CO2 | — | 56 | 382 | 541 |
| CH4 | 181 | 4 | 56 | — |
| CO | — | 270 | — | — |
| H2 | — | 70 | — | — |

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A cyclic reforming and re-heating process comprising:
   (a) reforming a hydrocarbon by introducing at least a portion of said hydrocarbon along with steam and optionally CO₂, through a first end of a first zone having a first volume containing bed packing materials and catalyst to produce a synthesis gas product;
   (b) passing at least a portion of the product of step (a) to a second zone having a second volume containing bed packing materials, and transferring sensible heat from the product to the packing materials;
   (c) removing substantially all of the product from said second zone;
   (d) introducing an oxygen-containing gas into a first end of said second zone; and
   (e) contacting said oxygen-containing gas with a fuel and combusting said gas and fuel within said zones, thereby re-heating said first zone to reforming temperatures and creating a fluegas which exits through the first end of said first zone, where each of steps (a) and (b) are done at a space velocity $C_1GHSV$ of at least 500 hr$^{-1}$ as calculated using a combined volume of the first and second zones.

2. The process of claim 1, wherein the combustion of said fuel with said oxygen-containing gas occurs at or substantially at an interface between said first and second zones.

3. The process of claim 1, wherein a non-combusting gas is introduced into the first end of said second zone either directly before step (d) or directly after step (e) and flows across said second zone, thereby transferring heat from said second zone to said first zone.

4. The process of claim 1 or 2, wherein the reforming of a hydrocarbon is carried out at a higher pressure than regenerating the heat of said first zone.

5. The process of claim 4, wherein the process has a characteristic $\Delta T_{HT}$ in the range of from about 0.1° C. to about 500° C.

6. The process of claim 1, wherein the catalyst is selected from the group consisting of noble metal components, Group VIII metal components, Ag, Ce, Cu, La, Mo, Mg, Sn, Ti, Y, and Zn.

7. The process of claim 1, wherein the packing materials of said first zone or said second zone or both are composed of a material selected from the group consisting of magnesium aluminum silicates, aluminum silicate clays, mullite, alumina, silica-alumina, zirconia, and mixtures thereof.

8. The process of claim 1, wherein the inlet temperature of the hydrocarbon, steam and optional CO₂ feed is in the range of about 20° C. to 600° C.

9. The process of claim 1, wherein the reforming temperature is in the range of about 700° C. to 2000° C.

10. The process of claim 1, wherein the inlet temperature of the oxygen-containing gas is in the range of about 20° C. to 600° C.

11. The process of claim 1, wherein the hydrocarbon, steam and optional CO₂ feed is heat exchanged with reforming products.

12. The process of claim 1, wherein the oxygen-containing gas is heat exchanged against the exiting fluegas.

13. The process of claim 1, including:
   measuring the temperature at or substantially at the interface between said first and second zones and, upon reaching a pre-determined first temperature, the oxygen-containing gas is introduced to said second zone; and
   measuring the temperature at or substantially at the first end of said first zone and, upon reaching a pre-determined second temperature, the hydrocarbon, steam and optional CO₂ feed is introduced to said first end of said first zone.

14. The process of claim 1, including:
   measuring the composition of the reforming product in step (c) and, upon reaching a pre-determined composition, the steps (a,b,c) are ended; and
   measuring the temperature at or substantially at the first end of said first zone and, upon reaching a pre-determined second temperature, the reforming and recovery steps (a,b,c) are begun.

15. The process of claim 1, wherein the second zone does not contain reforming catalyst.

* * * * *